W. MATTHIESSEN.
BAKING PAN.
APPLICATION FILED JAN. 19, 1912.
1,037,161.
Patented Aug. 27, 1912.
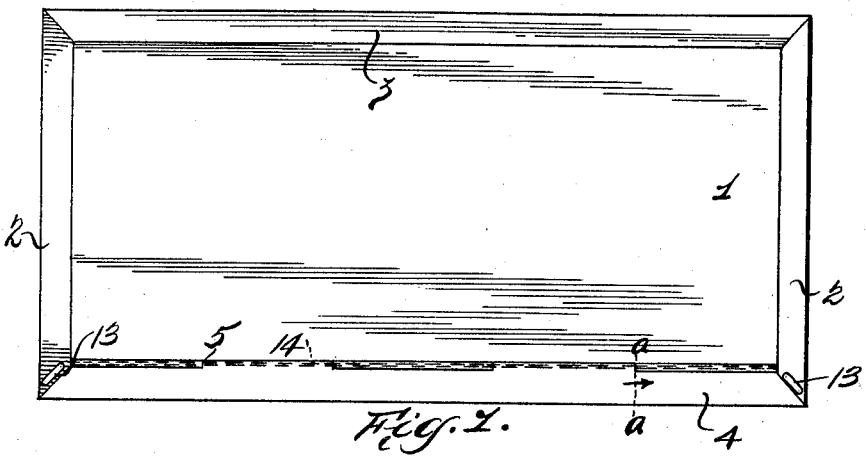
Fig. 1.
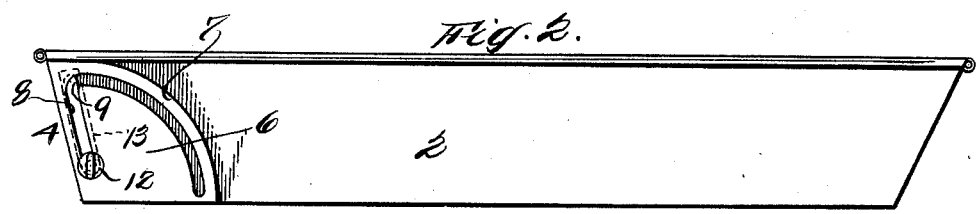
Fig. 2.
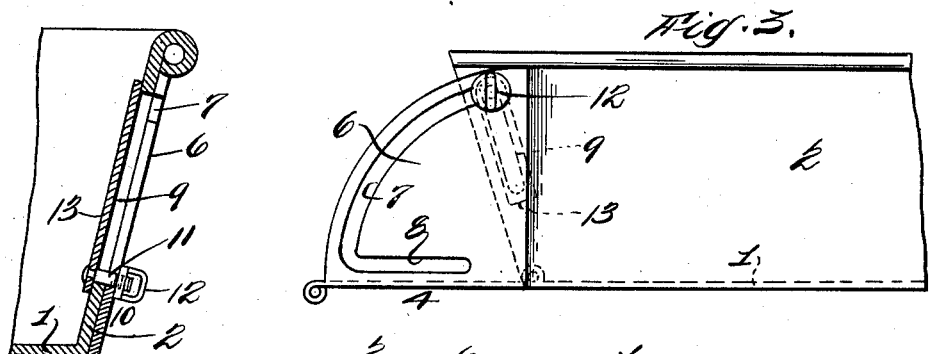
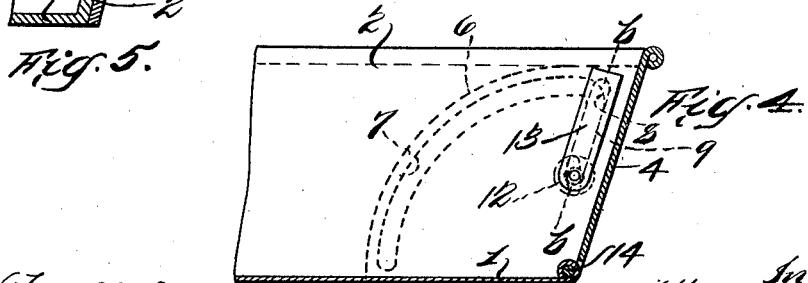
Witnesses
C. A. Jarvis
Estelle O. Hamburger
Inventor:
William Matthiessen
by Maurice Block
attorney.
COLUMBIA PLANOGRAPH CO., WASHINGTON, D. C.

UNITED STATES PATENT OFFICE.

WILLIAM MATTHIESSEN, OF NEW YORK, N. Y.

BAKING-PAN.

1,037,161.

Specification of Letters Patent. Patented Aug. 27, 1912.

Application filed January 19, 1912. Serial No. 672,157.

*To all whom it may concern:*

Be it known that I, WILLIAM MATTHIESSEN, a citizen of the United States of America, residing at Brooklyn, Kings county, city and State of New York, have invented certain new and useful Improvements in Baking-Pans, of which the following is a full, clear, and exact description.

This invention relates to an improved baking pan, the object being to provide a pan of this character so arranged that a cake, or any other article of pastry, can be readily taken therefrom, without breaking or otherwise injuring the same, after the said article has been cooked.

A further advantage of my improved pan is that the article in the pan can be treated with butter or other similar greasing or flavoring element without the necessity of raising the article from contact with the pan while cooking.

It is usual, when removing cake, bread, &c., from the pan in which it is baked, to pass a knife between the sides of the pan in order to break the contact between the pan and article therein. While the passing of a knife between the sides of the pan and the article will break contact therebetween, the contact between the pan and bottom of the cake, for instance, will not be broken and when the cake is lifted the cake will break.

In order that a knife can be inserted between the bottom of the pan and bottom of the article therein, I preferably secure one of the sides of the pan to an adjacent element, preferably the bottom, in such manner as to adapt it to be swung downwardly and away from the adjacent sides, thereby leaving the adjacent side of the article in the pan exposed, whereby a knife can be passed between the bottom of the pan and article therein.

I will now proceed to describe my invention in detail, the novel features of which I will point out in the appended claim, reference being had to the accompanying drawing, forming part hereof, wherein:

Figure 1 is a plan view of a pan embodying my improvement; Fig. 2 is an enlarged end view thereof looking from the right in Fig. 1; Fig. 3 is an enlarged fragmentary end view, the movable side being shown as thrown downwardly or open; Fig. 4 is an enlarged fragmentary sectional view, the movable side being shown as closed, the section being taken on a line $a$—$a$ in Fig. 1; and Fig. 5 is an enlarged detail sectional view, the section being taken on a line $b$—$b$ in Fig. 4.

As herein illustrated, my improvement consists of a pan, comprising a bottom 1, upstanding end-members 2, which are fixed or integral with the bottom 1 of the pan, an integral upstanding side member 3, and a movable upstanding side member 4 opposite thereto.

To adapt the side member 4 for movement away from the end members 2, I pivotally connect the same as at 5, to the bottom 1 of the pan. As can be seen in the drawing the movable side member 4 is provided with wings 6, which are preferably integral therewith, the said wings being each provided with a curved slot 7, and a straight slot 8, in communication therewith. The slots 8 aline with straight slots 9 in the end members 2 of the pan. To secure the movable side member in an open or closed position I provide a locking device 10, comprising a threaded stud 11 and a nut 12. The inner end of each stud 11 is secured to a cover or guard 13 which is provided for the purpose of covering the adjacent slot 9 in the end members of the pan. As can be seen, the studs 11 pass through the slots in the end members of the pan and wings 6 on the movable member 4.

The purpose of the guard 13 is, as has been stated, to cover its adjacent slot 9 to prevent the dough from entering the said slots when it is placed in the pan previous to baking. When the movable side 4 is closed the guard 13 will be moved or swung to cover its slot 9 as shown in Figs. 4 and 5. The radial point of the slots 7 is located centrally of the pin 14, which pivotally secures the side 4 to the bottom 1.

After the cake, for instance, has been baked, the side 4 can be opened to the position shown in Fig. 3, at which time a knife can be inserted between the cake and bottom 1 of the pan. In this open position, butter, grease or the like can be readily spread between the bottom of the cake and the pan, whereas in the ordinary pans this could only be done at the risk of breaking the cake, as the rigid vertical side members of the pan prevented easy access to the bottom of the cake.

It will, of course, be understood that the nut 12 holds the side 4 in an open or closed position; the side 4, when opened, acts as a handle, by which means the pan can be withdrawn from the oven. The curved clots 7 allow the side 4 to be opened, which is quite obvious.

The purpose of the straight slots 8 and 9 is to provide an additional locking facility for the movable side 4, when said side is closed. When the side 4 is closed, the stud 11 will be moved to the bottom of the slots 8 and 9, whereby the ends of the pan and the wings are locked together, for the reason that the side 4 cannot be moved when the stud 11 is placed at the lower end of the said slots. By virtue of this extra locking facility, I do not depend entirely upon the nut 12 to hold the side 4 in a closed position.

Having now described my invention, what I claim and desire to secure by Letters Patent is:

A baking pan consisting of a bottom, fixed end members, a fixed side member, a side member pivotally secured to said bottom, wings carried by said pivoted side member, said end members and said wings being provided with slots in alinement, a threaded stud passing through said slots, a guard adapted to cover the slots in said end members, carried by said studs at the inner ends thereof, and a nut carried by the threaded ends of said studs adapted to bind said wings to said end members.

Signed at New York city, N. Y., this 11th day of January, 1912.

WILLIAM MATTHIESSEN.

Witnesses:
ESTELLE O. HAMBURGER,
EDWARD A. JARVIS.

Copies of this patent may be obtained for five cents each, by addressing the "Commissioner of Patents Washington, D. C."